Jan. 2, 1968  W. NEUKOMM  3,361,495

BEARING ASSEMBLY

Filed May 20, 1963

Walter Neukomm,
Inventor

By Wenderoth, Lind and Ponack
attorneys 3,361,495
BEARING ASSEMBLY
Walter Neukomm, "La Fenatte," Court,
Bern, Switzerland
Filed May 20, 1963, Ser. No. 281,424
Claims priority, application Switzerland, May 21, 1962,
6,139/62
1 Claim. (Cl. 308—63)

The present invention relates to a bearing assembly, especially for machines of any kind and in particular for high precision machine tools.

One object of the invention is to provide a bearing assembly in which wear of the mutually contacting bearing surfaces is kept down to a minimum and in which the play between these bearing surfaces, once it is properly adjusted, remains unaffected over long running periods.

Another object of the invention is to provide a bearing assembly in which the play between bearing surfaces can be kept small and which therefore can be used in machine tools for high-accuracy work.

A further object of the invention is to provide a bearing assembly in which both the radial and the axial play between elements which are rotatable with reference to each other can be easily adjusted with high accuracy.

These and other objects are achieved according to the present invention in a bearing assembly comprising at least one pair of elements rotatable with reference to each other and having mutually contacting bearing surfaces, by making at least part of each of these elements, and in particular those parts of each of these elements which comprise the said bearing surfaces, of cemented hard carbide, comprising a powered hard metal carbide such as tungsten carbide sintered together with a ferrous bonding metal, preferably cobalt in an amount of between 4 and 20 percent of the total. The material may comprise other metals such as titanium, tantal, zirconium, their carbides and alloys. Such cemented hard carbide products have been known for a long time in the manufacture of cutting tools.

Figure 1:
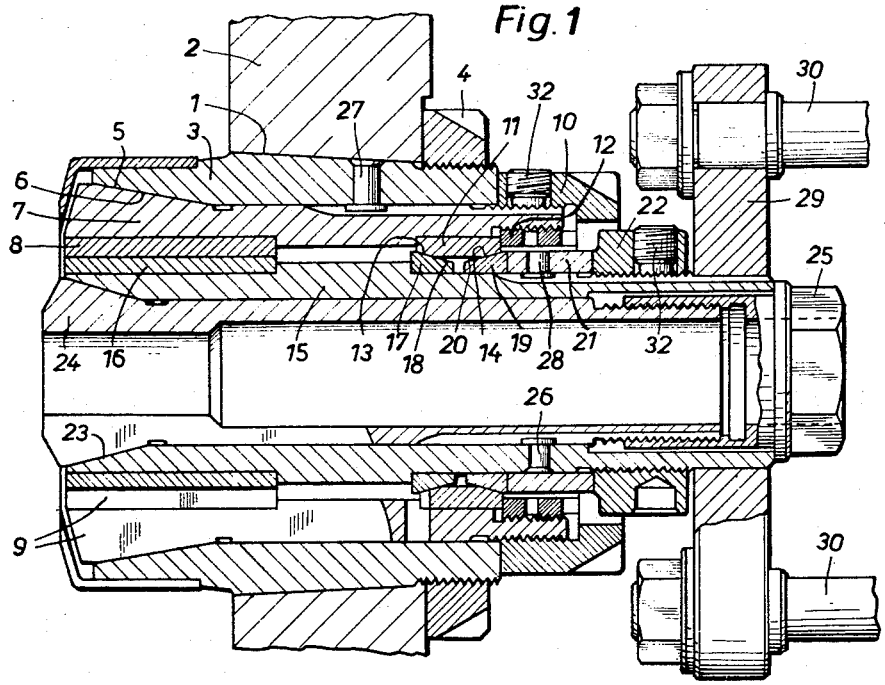
Figure 2:
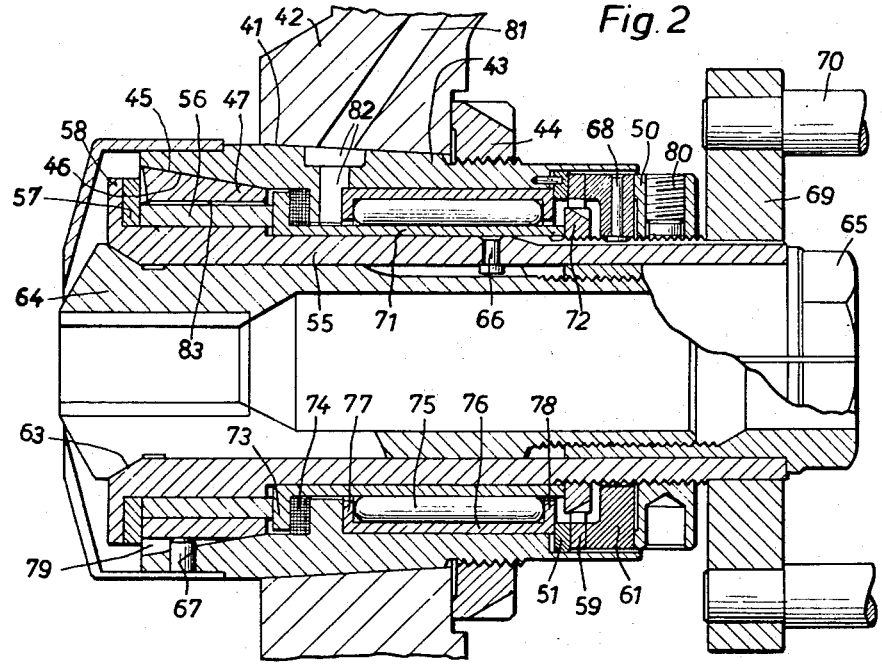

The invention will now be described, by way of example only, with reference to the accompanying drawings in which FIGS. 1 and 2 represent, in axial section, two different embodiments of a bearing assembly in a high-precision lathe.

The bearing assembly for a high-precision lathe represented in FIG. 1 is mounted in a slightly conical opening 1 of a wall 2 which is part of the frame of the lathe, by means of an outer sleeve 3 fitted into the opening 1 at its outer surface, which also is slightly conical. A nut 4 screwed onto a threaded portion of the sleeve 3 beyond the small end of its conical portion locates the sleeve immovably in the wall opening 1.

The inner surface of the sleeve 3 comprises a conical seat 5 for the outer cone 6 of another sleeve 7. Extending over somewhat more than the same portion of the length of the sleeve 7 as the cone 6, there is a cylindric bushing 8 made from tungsten carbide powder sintered with powdered cobalt into a very hard material. This bushing is brazed to the steel sleeve 7. A rivet 27 which is forced into the wall of the outer sleeve 3 and which engages a longitudinal groove in the outer surface of the sleeve 7 prevents rotation of the latter.

In the walls of the sleeve 7 and of the bushing 8, there is an axial slot 9 which extends axially over the whole length of the cone 6 and of the bushing 8 and beyond it, but not, in this example, over the full length of the sleeve 7. This slot 9 permits deflection of the walls of the sleeve 7 and of the bushing 8 inwardly towards their axis. The slot is shown as comprising the plane of the drawing, that is, as having plane sides. However, it is preferred that it follows a helical surface which intersects the substantially cylindric inner surface of the bushing 8 along a helical line running, for example, at an angle of about 5° with reference to the axis of the bushing. As another alternative (not shown), the slot in the bushing 8 could be helical and that in the sleeve 7 could be plane and a little wider than that of the bushing. Although one slot 9 only is shown in the drawing, there could be a plurality of them, preferably three at angular spacings of 120°.

A nut 10 which abuts the end face of the outer sleeve 3 and which is screwed onto the sleeve 7 serves to draw the latter in the direction in which the cone 6 converges, thus causing the walls of the sleeve 7 to become deflected inwardly in the region of the cone 6 and of the bushing 8.

At the end of its bore which is remote from that into which the bushing 8 is brazed, the sleeve 7 has a cylindrical seating which centers a ring 11 again made from cemented tungsten carbide, this ring being axially retained at one end, by an inner shoulder of the sleeve wall, and at its other end by a ring nut 12 which is screwed into the sleeve. Internally, the ring 11 has two conical bearing surfaces 13 and 14 facing in opposite directions.

The fixed sleeve 7 thus mounted and aligned rotatably supports another sleeve 15 which is not slotted and therefore has an uninterrupted annular cross-section substantially over its whole length. An unslotted cylindrical bushing 16 made from cemented tungsten carbide like the bushing 8, is brazed on the outer surface of the rotatable sleeve 15 and extends over the same length as the bushing 8. The two bushings 8 and 16 have mutually contacting cylindrical bearing surfaces, which are accurately ground. The play between the bearing surfaces, namely, the outer surface of the unslotted bushing 16 and the inner surface of the slotted bushing 8, is adjustable and can be suppressed by tightening the nut 10, by which the front portion of the walls of the fixed sleeve 7 and of the bushing 8 can be deflected more or less towards the bushing 16.

A ring 17 also made from cemented tungsten carbide is brazed farther back on the rotatable sleeve 15. This ring 17 has a conical outer bearing surface 18 which contacts the conical bearing surface 13 of the ring 11.

Finally, the rotatable sleeve 15 carries a third ring 19 also made from cemented tungsten carbide, which is axially slidable on the sleeve 15 and which has a conical bearing surface 20 adapted to contact the other conical bearing surface 14 of the ring 11. The third ring 19 is brazed to the annular end face of a ring 21 which is positioned by means of a nut 22 screwed onto a thread on the rotatable sleeve 15. By tightening this nut 22 more or less, it is possible to adjust, and if desired to suppress, the sum of the axial play between the abutting bearing surfaces 13 and 18 and between the abutting bearing surfaces 14 and 20, that is, the axial play of the rotatable sleeve 15 with reference to the fixed sleeve 7. A rivet 28 which has been forced into the wall of ring 21 and engages a longitudinal groove of the unslotted rotatable sleeve 15 prevents the ring 21 from rotating when the nut 22 is being tightened. The longitudinal groove does not extend all the way through the thickness of the sleeve wall; therefore, the annular or transverse cross section of the sleeve is continuous or uninterrupted.

The front portion 23 of the bore of the rotatable sleeve 15 is turned out conically to provide a seat for the conical front portion of a chuck 24 of known construction, the said front portion of which is divided by three axial slots angularly spaced from each other by 120°, into three jaws for seizing a workpiece. These jaws can be tightened on the workpiece by means of a nut 25 which is supported by the rotatable sleeve 15 and engages the screw-threaded rear portion of the chuck. The chuck is angularly coupled to the sleeve 15 by means of a rivet 26 which is forced into the wall of the sleeve 15 and engages a longitudinal groove in the outer surface of the chuck 24. Thus it is possible to secure the workpiece between the jaws of the chuck to couple it angularly with the sleeve 15. This sleeve is driven by the motor of the lathe by means of a coupling flange 29 secured on the sleeve and carrying two pins 30 adapted to engage a rotating driver plate.

Once the play between the bearing surfaces has been adjusted as desired, the nuts 10 and 22 can be arrested by screws 32.

Of course, in a different application, the inner sleeve 15 could be fixed, for example on a fixed stub axle, the outer sleeve 7 being then fixed in a rotating member, e.g. a wheel to be rotatably supported by the device. This rotating member would take the place either of the outer sleeve 3 or only of the wall 2 in which that outer sleeve is mounted.

On the other hand, the rings 17, 19 and 21 and the nut 22 must not necessarily be supported by the rotating member or inner sleeve, and the ring 11 having two oppositely facing bearing surfaces must not necessarily be mounted in the fixed member or outer sleeve. On the contrary, this two-surface ring could be fixed on the inner sleeve by means of a threaded ring, or by brazing if this is compatible with the desired mode of assembling the device, while the two rings 17 and 19 each of which has a single bearing surface, and the means for securing the ring 19, would be mounted on the inner sleeve.

The abutting bearing surfaces 13, 14, 18 and 20 must not necessarily be conical. They could as well be, for instance, annular plane surfaces.

The chuck bearing assembly represented in FIG. 2 serves the same purpose as that shown in FIG. 1 and described above. It comprises a stationary outer sleeve 43 having a slightly conical outer surface fitting an opening 41 in the wall 42 of the supporting frame of the lathe, and located in that opening by means of a ring nut 44.

The inner surface of the sleeve 43 comprises a conical front portion 45 adapted to receive directly a bushing 47 made from cemented tungsten carbide. This bushing 47 has a conical outer surface 46 mating with the conical inner surface portion 45 of the sleeve 43, but not brazed or otherwise bonded thereto. The bushing is rendered slightly flexible in a radial direction by means of a single slot (not shown) extending from the bore of the sleeve to the conical surface 46; the slot may follow a radial plane or a helical surface passing through its axis. Further, the bushing 47 has a groove 79 extending longitudinally in its outer surface 46. This groove is engaged by a rivet or pin 67 which projects from the surface 45 of sleeve 43 so as to prevent rotation of the bushing 47 within the sleeve.

Both the cylindrical inner surface and the plane, annular front surface of the bushing 47 act as bearing surfaces for the rotatable part of the assembly which will be described below. Another plane and annular bearing surface is provided at the rear of the sleeve 43 by a ring 51 of rectangular cross-section which rests on a shoulder within the said sleeve.

The rotatable part of the assembly comprises as its principal member a tubular sleeve 55 having, at its front end, an external flange 58. This flange is lined to the rear with a ring 57 of cemented tungsten carbide having a ground plane surface which in part acts as bearing surface in contact with the aforesaid plane annular front surface of the bushing 47 to prevent displacement of the bushing 55 to the rear. The inner part of the surface of ring 57 serves as an abutment surface for a bushing 56, also of cemented tungsten carbide, providing a cylindrical bearing surface cooperating with that of bushing 47. In opposition to this latter, the bushing 56 is not slotted but makes a close fit around sleeve 55.

The rear end of bushing 56 is abutted by a spacing tube 71 having an external flange 73, which tube is maintained in position on the sleeve 55 by a ring nut 72 screwed onto a threaded rear portion of that sleeve. The tube 71, which preferably is made from hardened steel, serves as the inner race for a needle bearing 75 between the fixed outer sleeve 43 and the rotating inner sleeve 55. The needle bearing has an outer race 76 having inwardly extending flanges 77, 78 at its forward and rear ends, respectively. The forward and flange 77 abuts an inner shoulder of the outer sleeve 43 while the rear end flange 78 provides a seat for the already mentioned cemented carbide ring 51.

The plane, annular bearing surface of the last-mentioned ring 51 cooperates with a similar bearing surface of another ring 59 also made from cemented tungsten carbide, which surrounds the nut 72 and is brazed to the front face of a cover ring 61. This latter is retained by the main play adjusting nut 50 which is screwed on the threaded portion of the sleeve 55 behind the nut 72. Angular displacement of the cover ring 61 and of the cemented carbide ring 59 brazed to it is prevented by a rivet 68 projecting from the ring 61 into a longitudinal groove of the sleeve 55.

As does the sleeve 15 in the example of FIG. 1, the rotating sleeve 55 carries a flange 69 with a pair of driving pins 70, and it contains a chuck member 64 which can be tightened on a workpiece to be rotatably supported. The chuck member 64 is slotted in its front portion to provide three jaws which are deflected radially inwards by a conical seating surface 63 of the sleeve 55, whenever it is drawn to the rear by a nut 65 screwed onto the chuck member and seated on the rear face of the sleeve. The play between the cooperating bearing surfaces of the cemented carbide elements in the whole assembly can be adjusted in this example by means of the main adjusting nut 50. When this is tightened, it reduces or suppresses on one hand the play between the cooperating plane bearing surfaces of the rings 51 and 59 at the rear end of the assembly, and on the other hand, the play between the cooperating plane bearing surfaces of the externally conical, slotted bushing 47 and of the abutment ring 57. At the same time, since a force urging the bushing 47 to the rear is thus transmitted to this bushing, the latter is contracted by the conical surface 45 and any play between the cooperating cylindrical bearing surfaces of the bushings 47 and 56 is taken up as far as desired.

When the play has been thus adjusted, the main adjusting nut 50 can be arrested by means of an arresting screw 80.

The purpose of the needle bearing 75 is to prevent angular displacement of the axis of the rotating part about a point determined by the radial cooperation of bushings 47 and 56, a task which requires somewhat less accuracy and involves smaller forces than the taking-up of radial and axial loads accomplished by the tungsten carbide bearings 51–59, 47–56, and 47–57.

FIG. 2 also depicts an arrangement for lubricating the bearings in the assembly. Lubricant is supplied through a duct 81 in the frame wall 42 and through a hole 82 in the fixed sleeve 43 to the outer surface of the spacing tube 71. Thence, the lubricant proceeds, on one side, to the rear along the bearing needles 75 and to the bearing formed by the rings 51 and 59. On the other side, the lubricant proceeds to an annular chamber 74 containing a felt ring, and thence to grooves 83 in both bearing surfaces of the bushing 47, whereby this lubricant is distributed over the whole of these surfaces when the abutment ring 57 and the bushing 56 rotate.

I claim:
1. In a bearing assembly for rotatably supporting a first member on a second member,
a first sleeve adapted to be fixed to said first member,
a second sleeve adapted to be fixed to said second member,
a lining member of sintered metal carbide powder secured on each of said first and second sleeve, each of said lining members having a cylindrical bearing surface cooperating with a cylindrical bearing surface of the other of said lining members, the first of the said sleeves and the lining member secured thereto being of uninterrupted annular cross-section and the second sleeve and the lining member secured thereto having at least one slot extending through their walls and at least the length of the said lining to enable the said walls to be deflected radially towards the said first sleeve and the lining member secured thereto, means for deflecting the said walls of the second sleeve and of the lining member secured thereto, a first ring made from sintered metal carbide powder secured to one of the said sleeves, said first ring having two surfaces of revolution tapering in opposite axial directions, a second ring and a third ring made from sintered metal carbide powder mounted on the other of said sleeves on opposite sides respectively of said first ring and having each a surface of revolution cooperating with one of the surfaces of revolution of said first ring, the said second ring being secured to said other sleeve and said third ring being axially displaceable on said other sleeve, and means for adjusting the axial position of said third ring on said other sleeve.

References Cited
UNITED STATES PATENTS

| | | | |
|---|---|---|---|
| 2,263,117 | 11/1941 | Blanchard et al. | 279—52 |
| 2,685,545 | 8/1954 | Sindeband. | |
| 3,009,747 | 11/1961 | Pitzer | 308—71 |

EVERETTE A. POWELL, JR., *Primary Examiner.*

DAVID J. WILLIAMOWSKY, MARTIN P. SCHWADRON, *Examiners.*

R. F. HESS, *Assistant Examiner.*